United States Patent [19]

Schorscher

[11] 4,347,096
[45] Aug. 31, 1982

[54] PORTABLE TIRE REPAIR APPARATUS

[75] Inventor: John J. Schorscher, Toronto, Canada

[73] Assignee: Tip Top Remaco Ltd., Toronto, Canada

[21] Appl. No.: 273,181

[22] Filed: Jun. 12, 1981

Related U.S. Application Data

[63] Continuation of Ser. No. 912,199, Jun. 5, 1978, abandoned.

[30] Foreign Application Priority Data

Apr. 24, 1978 [CA] Canada .................................. 301840

[51] Int. Cl.³ .......................... B29H 5/16; B30B 15/34
[52] U.S. Cl. .................................. 156/583.3; 156/97; 156/583.7; 219/243; 219/251; 425/12; 425/26; 100/93 S
[58] Field of Search ............... 156/583.1, 583.3, 583.6, 156/583.7, 95, 97, 359; 219/243; 425/11, 12, 26; 100/93 P

[56] References Cited

U.S. PATENT DOCUMENTS

| | | | |
|---|---|---|---|
| 1,718,485 | 6/1929 | O'Sullivan | 219/243 |
| 2,292,485 | 8/1942 | Slatkin | 156/583.7 |
| 2,447,740 | 8/1948 | Crowley | 156/583.7 |
| 2,530,411 | 11/1950 | Van Scoyk | 156/583.7 |
| 2,538,149 | 1/1951 | Fannen et al. | 156/583.9 |
| 2,651,350 | 9/1953 | Casey et al. | 156/583.4 |
| 2,743,761 | 5/1956 | Snyder et al. | 156/583.3 |
| 2,825,930 | 3/1958 | Gaillard | 156/583.7 |
| 2,837,767 | 6/1958 | MacDonald | 156/97 |
| 2,894,283 | 7/1959 | Salisbury | 156/583.7 |
| 3,172,158 | 3/1965 | Herman et al. | 425/12 |

Primary Examiner—Michael G. Whyshyn

[57] ABSTRACT

The specification describes a portable tire repair apparatus which is sleevable within a tire and is provided with heating elements which are positioned to effect repairs to both tire treads and tire sidewalls. The heating elements are resilient so that they do not deform the tire during the repair operation.

3 Claims, 7 Drawing Figures

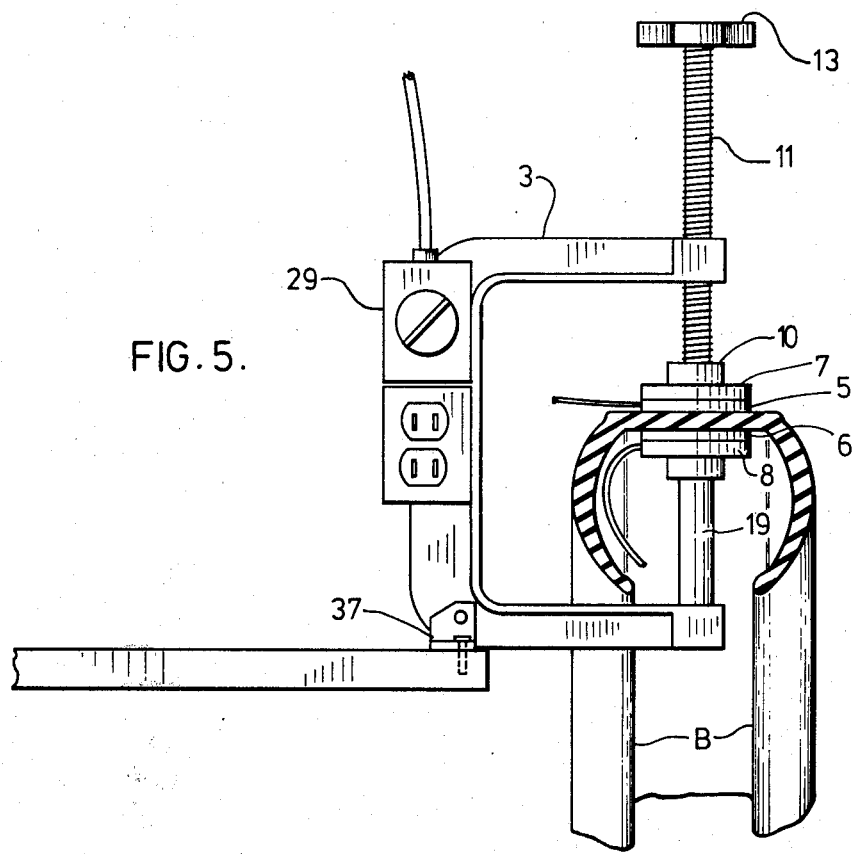
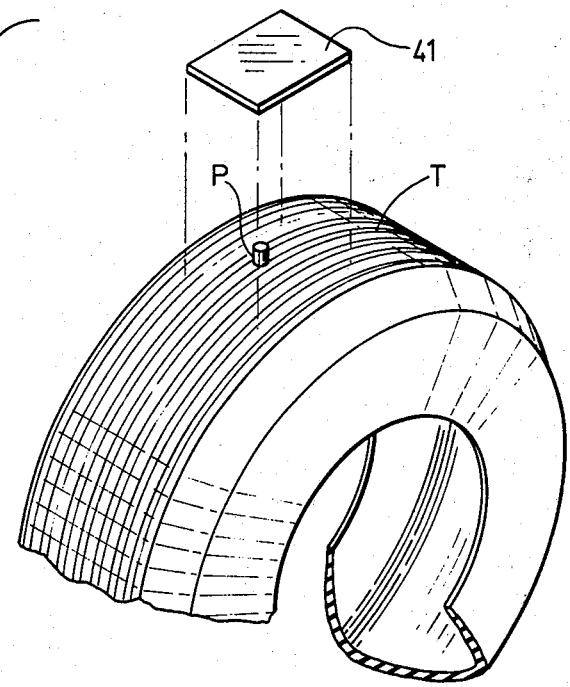

4,347,096

PORTABLE TIRE REPAIR APPARATUS

This is a continuation, of application Ser. No. 912,199 filed June 5, 1978, now abandoned.

FIELD OF THE INVENTION

This invention relates to a portable tire repair apparatus.

BACKGROUND OF THE INVENTION

Conventional tire repair apparatuses generally consist of a mandril for supporting a tire, a heating pad insertable within the tire for curing the repair plug, and an inflatable air bag which fills the interior of the tire and maintains pressure on the heating pad during the curing of the plug. Such apparatuses are relatively inefficient in that they do not provide adequate pressure on the curing plug and the plug is not fully vulcanized because it is not cured from both the interior and the exterior of the tire. A further drawback of such a tire repair apparatus is its size and awkwardness which renders it ineffective as an easily manageable, portable unit.

Recently, efforts have been made to produce portable tire repair apparatus. However, these efforts have not been totally effective in that the portable units presently available are not capable of gaining access to essentially any area on the tire body to effect repairs thereto. To add to the versatility, such portable units have been provided with heating pads mounted over expandable air bags in an attempt to reach otherwise inaccessible areas within the tire. However, even this arrangement does not permit total access to the interior of the tire.

The present invention has been constructed to overcome these difficulties, and consists of a portable tire repair apparatus adapted for repairing both tire treads and tire sidewalls. The apparatus comprises an open sided frame, two resilient heating elements supported interiorly of the frame at the open side and presenting opposing heating surfaces, and means for adjusting the distance between the heating elements and for clamping a damaged tire portion therebetween. The frame is dimensioned for sleeving of the tire over the frame and the heating elements are supported from the frame in a manner permitting access to and contact with both the interior and the exterior of a tire tread, as well as the tire sidewall, to effect repairs to essentially all areas on the tire surface.

BRIEF DESCRIPTION OF THE DRAWINGS

The above, as well as other features and advantages of the present invention will become apparent from the following detailed description of the preferred embodiments as shown in the drawings, wherein:

FIG. 4 is a perspective view looking down on a damaged tire with an uncured plug secured in the damaged portion of the tire;

FIG. 5 is an enlarged front view of the portable tire repair apparatus of FIG. 2 showing a section of the tire cut away;

DETAILED DESCRIPTION ACCORDING TO THE PREFERRED EMBODIMENTS

Figure 1:
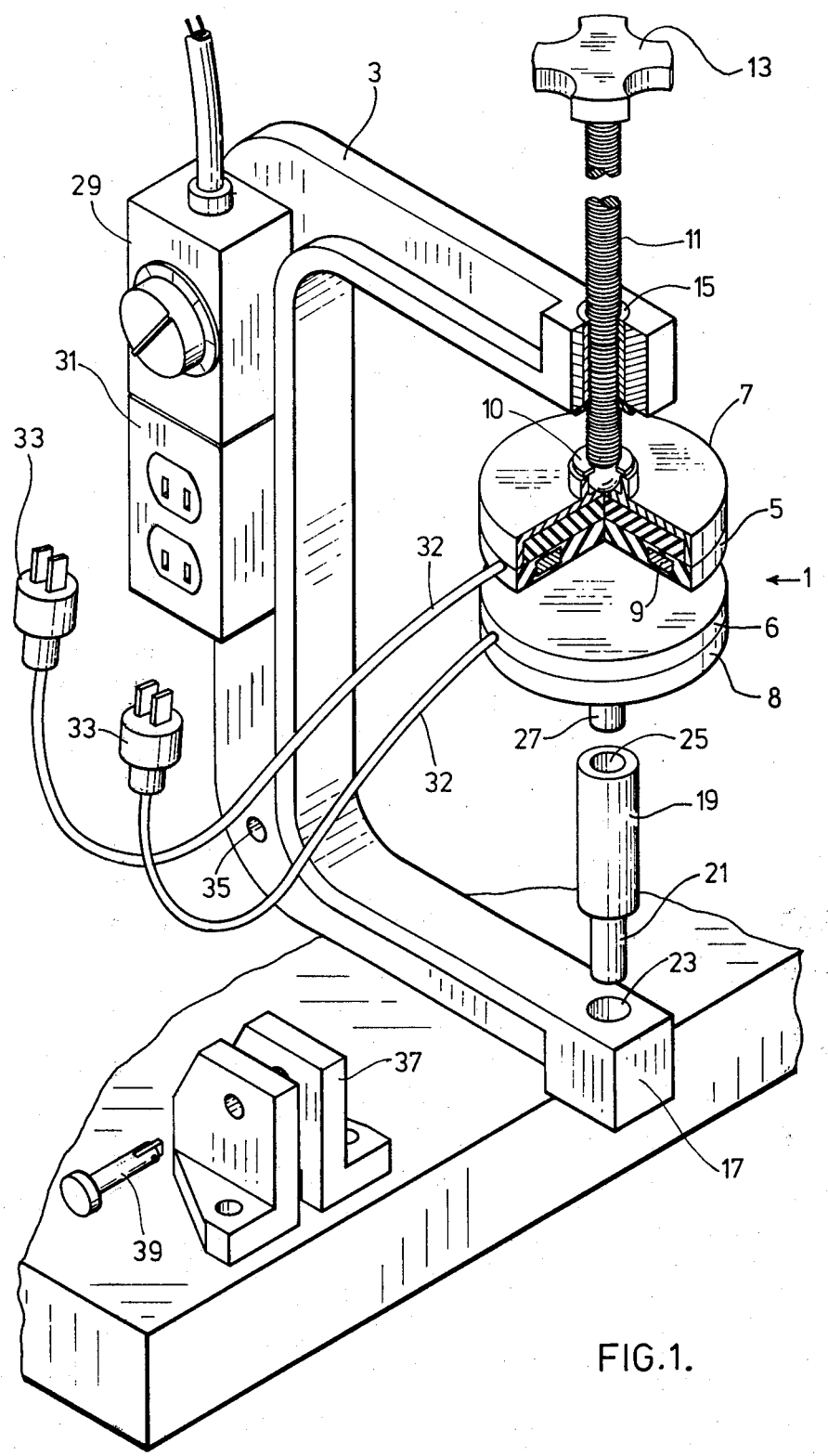
FIG. 1 is a partially exploded perspective view looking down on a preferred arrangement of a portable tire repair apparatus according to this invention.

Referring to FIG. 1, portable tire repair apparatus, generally indicated at 1, comprises an open sided frame 3 with a pair of resilient heating elements 5 and 6 supported between the free ends 15 and 17 of the frame. Both heating elements have a disc-like shape and are constructed from a rubber material, which maintains its resiliency at temperatures at least as high as 155° C. In addition, each of the heating elements includes its own thermostat 9 (only one of which can be seen in the drawings) for maintaining a pre-set temperature range.

According to the construction shown in FIG. 1, heating element 5 is used as an exterior element and is adjustable towards and away from the interior heating element 6 by means of rod 11 threaded through free end 15 of frame 3. The exterior heating element is supported to the interior end of the rod through its disc-like shaped metallic backing 7 by means of ball and socket joint 10. Threaded rod 11 is provided with handle 13 for facilitating adjustment of the rod.

Heating element 6 is supported from the free end 17 of the frame through its metallic disc shaped backing 8 by means of removable shank 19. The shank includes an extension 21 which fits within opening 23 provided in the free end of the clamp, as well as opening 25 for receiving stud 27 extending from metallic backing 8.

Mounted to the frame is an electrical box 31 for receiving plugs 33 connected by cords 32 to the respective heating elements. The duration of operation of the heating elements, is controlled by a manually adjustable timing device 29.

The entire apparatus is secured to a suitable supporting surface by means of bracket 37 and pin 39, which extends through pin receiving aperture 35 provided in the frame.

FIG. 4 shows a tire T damaged in the tire tread. In preparing the tire for repair, the puncture is first cleaned with tungsten carbide rasp and coated from both sides with a vulcanizing cement. After the vulcanizing cement is dried, a plug of cushion gum or tread gum P, which is an uncured rubber, is forced into the puncture with a head of the cushion gum extending outwardly from both sides of the tire tread. The plug is then covered from both sides with a piece of holland cloth 41 or other non-cohesive suitable material for preventing the curing of the plug on the heating elements.

Figure 2:
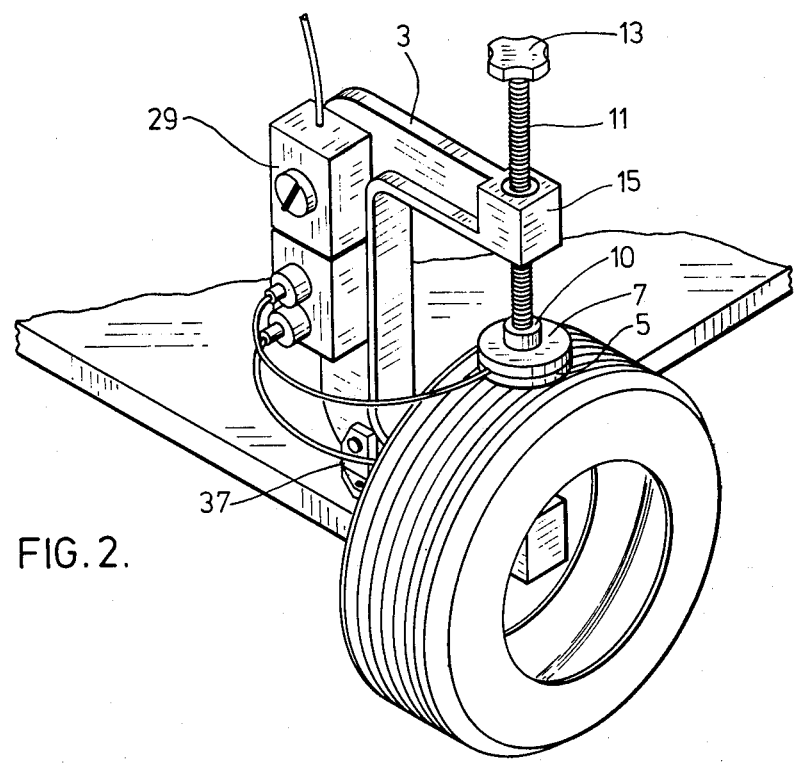
FIG. 2 shows the portable tire repair apparatus of FIG. 1 effecting repairs to a tire tread.

After the tire tread has been suitably prepared, it is then placed on the tire repair apparatus as shown in FIG. 2, with the heating elements clamped over the damaged portion. It will be noted from FIG. 5 that heating element 6 must be spaced from the bottom portion of the C-shaped clamp by a distance equal to or greater than the depth of the sidewalls in order for the interior heating element to contact the interior of the tire tread. The provision of the elongated shank extending upwardly from the frame and supporting the heating element, insures such contact. Exterior heating element 5 is clamped down on the outside of the tread by means of the threaded rod and only requires hand tightening to effect the proper vulcanization. The rubber material forming the external heating element has a high co-efficient of friction and would understandably be very difficult to clamp down on the tire tread without the provision of ball and socket joint 10. However, the ball and socket joint permits relative rotation of the threaded rod and the metallic backing supporting the heating element thereby allowing a proper clamping of the tire tread between the two elements.

With the tire properly clamped in the tire repair apparatus, the heating elements are actuated to vulcanize the plug in the tire. Timer 29 is set to a desired time limit of approximately, one half hour, and the thermostats in the heating elements maintain the elements at essentially identical temperatures through the half hour heating operation. The optimal temperature to vulcanize the cushion gum is 150° C.±5° C. and the thermostats maintain the heating elements within this temperature range. As can be appreciated, the rubber material used in the heating elements must be one which maintains its resiliency at temperatures at least as high as the upper limit of the range given above.

It will be noted from FIG. 5 that due to the essentially planar surfaces of the heating elements, they clamp down essentially flushly on the tire tread, so that they heat the entire portion of tire tread clamped therebetween. Furthermore, the size and shape of the heating elements permit essentially total coverage of the tire tread so that substantially all of the tire tread is accessible to the heating elements, and in particular, the interior heating element for effecting repairs.

The portable tire repair apparatus is especially useful in repairing steel belted radial ply tires, particularly those provided on passenger vehicles and light trucks. If for instance the heating elements were constructed from a hard or metallic substance, presenting planar heating surfaces, such metallic heating elements would require extensive clamping on the tire tread in order to properly vulcanize the plug without its squeezing out from underneath the heating element. This substantial clamping on the tire over a long prolonged period, would produce a permanent deformation in the steel belts of the tire. However, the present invention, through the use of the resilient heating elements, overcomes this difficulty in that the heating elements tend to conform to the tire surface as opposed to distorting the tire, and due to their rubber construction, substantially eliminate the creeping of the plug from the desired area during vulcanization without applying excessive clamping forces.

As discussed above, the interior heating element must be spaced from free end 17 of clamp 3 at a distance which permits its contact with the interior of the tire tread. However, this spacing presents difficulties in the positioning of the interior heating element for effecting repairs to the tire's sidewall. Referring to FIG. 5, it can be seen that the distance between the tire beads B is less than the depth of the sidewalls, i.e., the distance between a tire bead and the tire tread, so that the distance between the heating element and the free end of the frame must be greater than the distance between the tire beads. Therefore, in order to permit insertion of the heating element between the tire beads in a position to effect repairs to the tire sidewalls, the heating element is disengageable from its operating position and according to the embodiment shown in the drawings, it includes a removable insert in the form of shank 19. Other means of disengaging the heating element from its operating position could be used and such other means could include a telescoping lockable support member, or even a swivel support for moving the heating element to and from an operating position.

Figure 3:
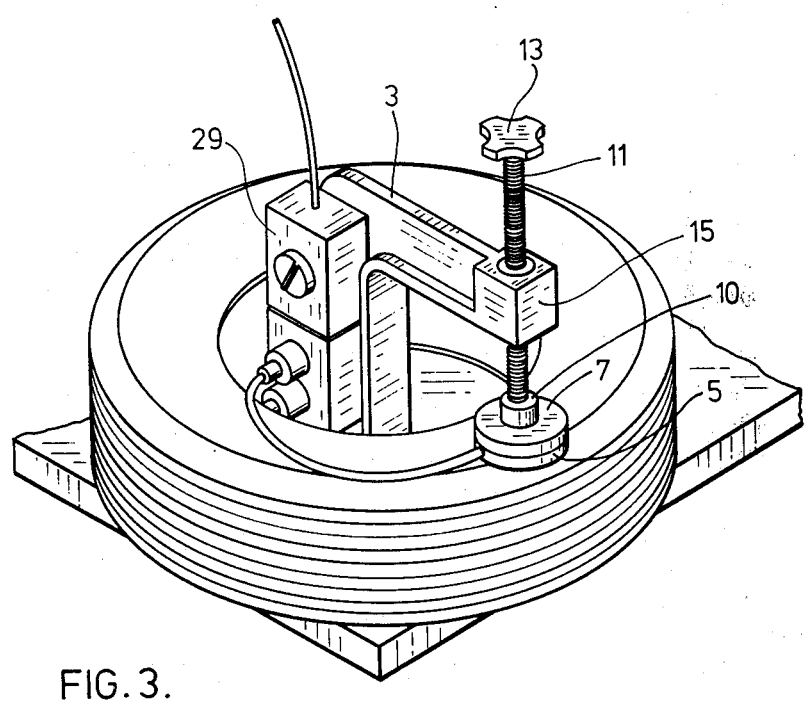
FIG. 3 shows the portable tire repair apparatus of FIG. 1 effecting tire repairs to a tire sidewall.
Figure 6:
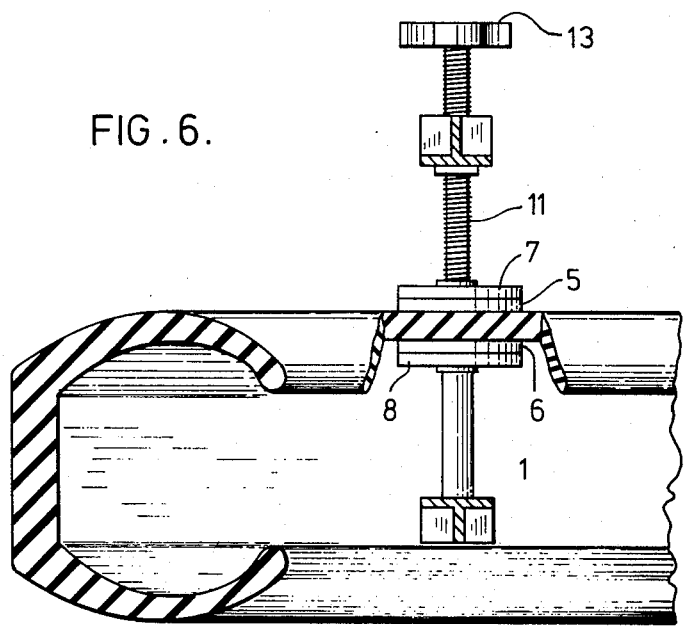
FIG. 6 is a sectional view of a tire with the interior heating element of the portable tire repair apparatus in position to effect repairs to the tire sidewall.
Figure 7:
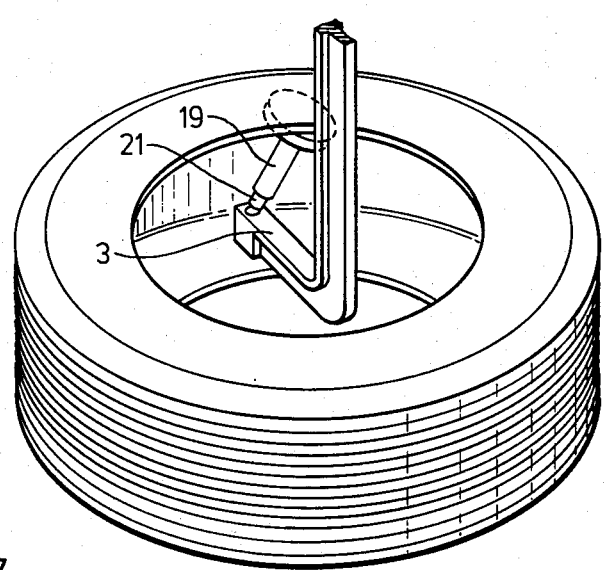
FIG. 7 is a partially exploded perspective view looking down on a tire during the locating of the interior heating element shown in FIG. 6.

FIG. 3 shows the portable tire repair apparatus in a position to effect repairs to the tire's sidewall. As can be seen in the Figure, the frame is dimensioned so that the tire can be sleeved over the frame, with the interior heating element, its support member, and the free end of the frame, between the tire sidewalls. FIG. 6 shows the interior heating element with its heating surface in contact with the interior of the tire's sidewall. As can be appreciated, if the frame were not sleevable by the tire, this positioning of the interior heating element required to provide access to essentially all areas on the inner surface of the tire's sidewall, would not be permitted. FIG. 7 shows the ease with which the interior heating element can be properly located through the use of the removable shank 19. If further working room is necessary, the heating element and its backing can also be removed from the shank to locate it between the tire sidewalls. As can be appreciated from FIG. 5, the distance between the sidewalls is greater than the distance between the beads, so that once the elements have been placed within the tire, there is additional working room for assembly of the heating element in its working position.

With the tire sleeved over the frame and the interior heating element supported in its working position, the exterior heating element is clamped down on the outside of the tire's sidewall. Once again, the provision of joint 10 allowing relative rotation of the threaded rod and metallic backing 7, permits the clamping of heating element 5 on the tire sidewall for the curing of the repair plug.

The portable tire repair apparatus according to this invention is completely portable and therefore, easily handled at the job site. To add to its portability, the frame and the metallic backing for the heating elements, are constructed from aluminum. The entire unit weighs approximately 11 pounds.

As can be appreciated from the description above, portable tire repair apparatus 1 includes numerous advantages and distinct features over other portable tire repair apparatuses such as that described in U.S. Pat. No. 3,172,158 issued Mar. 9th, 1965 to Herman et al. The unit according to the present invention, has been provided with a frame which is sleevable within the tire and means for disengaging the interior heating element from its working position to locate it between the tire sidewalls, so that it is not limited to reaching only certain areas on the interior of the sidewall surface. In addition, the solid heating elements of the present invention, apply a firm even pressure over the repair plug through their essentially planar heating surfaces which clamp flushly on the tire body to effect a full vulcanization.

Although various preferred embodiments of the invention have been described herein in detail, it will be apparent to those skilled in the art that variations can be made thereto without departing from the spirit of the invention or the scope of the appended claims.

The embodiments of the invention in which an exclusive property or privilege is claimed are defined as follows:

1. A portable tire repair apparatus comprising an open sided frame having interior and exterior free frame ends, opposing interior and exterior heating elements supported from said interior and exterior frame ends respectively, means for moving the exterior heating element to adjust the distance between said heating elements and for clamping a damaged tire portion therebetween and support means at said interior frame end for supporting said interior heating element in an operating position, said support means comprising a shank of fixed length for spacing said interior heating element away from said interior frame end to a position for gaining access to essentially all areas on the inner surface of the tire when in said operating position and a socket at said interior frame end for seating said shank, said shank being slidable out of and back into said socket for readily removing said shank and interior heating element from said frame to fit said interior frame end into the tire and for readily replacing said shank and interior heating element in said socket in a position for repairing sidewall damage when said interior frame end is in the tire, each of said heating elements having resilient heating surfaces and being provided with a thermostat for maintaining a preset temperature range at said resilient heating surfaces.

2. A portable tire repair apparatus comprising an open sided free ended frame, interior and exterior heating elements between the free ends of the frame, a threaded adjustment member for moving the exterior heating element to adjust the distance between said heating elements and for clamping a damaged tire portion therebetween, a support rod fitted to one of the free ends of the frame opposing said adjustment means for supporting said interior heating element in its operating position, said support rod being of a length to space said interior heating element away from said one free end of the frame by a distance to gain access to essentially all areas on the inner surface of the tire when in said operating position, said one frame end having a socket for seating said support rod and said support rod being slidable into and out of said socket for readily removing said support rod and interior heating element from said frame to fit said one free end into the tire and for readily replacing said support rod and interior heating element in said socket in a position for repairing sidewall damage after said one free end has been fitted within the tire, each of said heating elements having a resilient heating surface and being provided with a thermostat for maintaining a preset temperature range at said resilient heating surfaces.

3. A portable tire repair apparatus as claimed in claim 2, wherein said support rod is provided with a socket and said interior heating element includes a shank portion for slidably fitting into the socket on said support rod to readily remove said interior heating element from said support rod when outside of the tire and to readily replace said interior heating element at said support rod when located within the tire.

* * * * *